United States Patent
Haniya et al.

(10) Patent No.: US 6,734,367 B2
(45) Date of Patent: May 11, 2004

(54) CABLE PROTECTIVE SPRING AND METHOD FOR FIXING THE CABLE PROTECTIVE SPRING

(75) Inventors: Kazuhiro Haniya, Fukuoka (JP); Atsushi Ichibangase, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/203,271
(22) PCT Filed: Feb. 8, 2001
(86) PCT No.: PCT/JP01/00902
§ 371 (c)(1), (2), (4) Date: Aug. 8, 2002
(87) PCT Pub. No.: WO01/59900
PCT Pub. Date: Aug. 16, 2001

(65) Prior Publication Data
US 2003/0010526 A1 Jan. 16, 2003

(30) Foreign Application Priority Data
Feb. 9, 2000 (JP) .................................... P-2000-032370

(51) Int. Cl.⁷ .................................................. H01B 7/00
(52) U.S. Cl. ........................................ 174/135; 248/51
(58) Field of Search .............................. 174/68.1, 68.3, 174/72 A, 135, 136; 248/51

(56) References Cited

U.S. PATENT DOCUMENTS

| | | | | |
|---|---|---|---|---|
| 4,582,281 A | * | 4/1986 | Van Camp | 248/51 |
| 5,534,665 A | * | 7/1996 | Long | 174/72 A |
| 5,824,960 A | | 10/1998 | Markling | |
| 6,274,813 B1 | * | 8/2001 | Houte et al. | 174/68.3 |
| 6,603,074 B2 | * | 8/2003 | Seo | 174/135 |

FOREIGN PATENT DOCUMENTS

JP  3-281190  12/1991

* cited by examiner

*Primary Examiner*—Dean A. Reichard
*Assistant Examiner*—Adolfo Nino
(74) *Attorney, Agent, or Firm*—Sughrue Mion, PLLC

(57) ABSTRACT

The present invention intends to provide a cable protection spring capable of being attached and fixed through one-touch operation without requiring an ironmongery goods or a tool for fixing.

In order to attain this object, according to the present invention, in the cable protection spring which is arranged in a manner that a wiring cable is passed within and through a coil spring 5 to protect the wiring cable from mechanical damage, the coil spring 5 is provided with a portion 5a having a diameter larger than a diameter of remaining portion thereof.

3 Claims, 3 Drawing Sheets

FIG. 5 (a) PRIOR ART
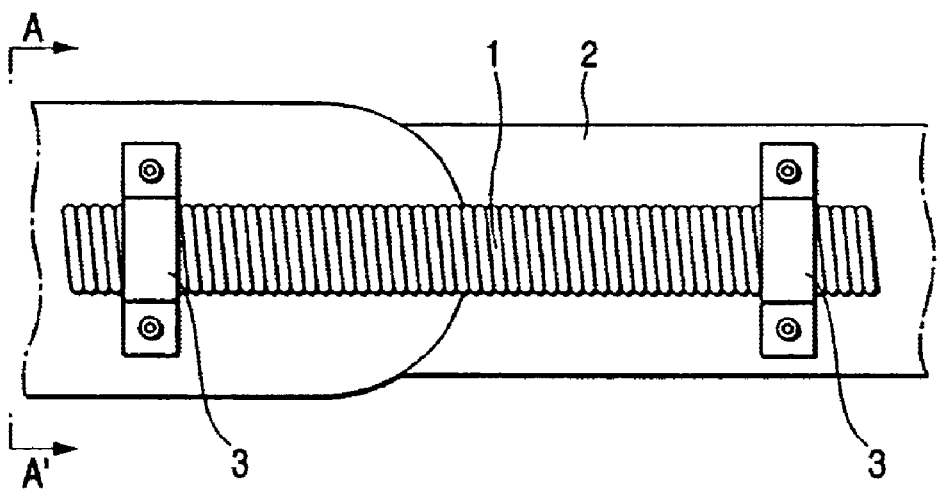
FIG. 5 (b) PRIOR ART
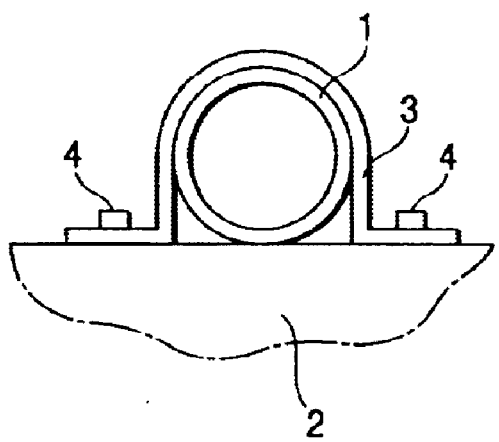

CABLE PROTECTIVE SPRING AND METHOD FOR FIXING THE CABLE PROTECTIVE SPRING

TECHNICAL FIELD

The present invention relates to a cable protection spring for protecting a cable from mechanical damage and a method for fixing the cable protection spring to a structure.

BACKGROUND ART

In the case of disposing an electric cable in a structure such as a mechanical device or a casing, it is known to pass the electric cable within and through a coil spring in order to protect the electric cable from mechanical damage caused by, for example, stress due to strong bending, rub due to contact with a rough surface, shear due to contact with a sharp portion. A coil spring used for such a use is generally called a cable protection spring. In particular, in the case of disposing a power cable, a signal line or a pipe for a pneumatic device within the arm of an articulated robot, the cable etc. moves relatively within the arm in accordance with the movement of the arm. Thus, the cable protection spring for protecting the cable etc. from the damage caused by being rubbed is indispensable.

The conventional cable protection spring has such a simple shape that the diameter thereof is constant along its entire length, and so a saddle having an Ω-shaped section is employed in the case of fixing the cable protection spring to a structure etc.

FIG. 5 is diagrams for explaining a state where the conventional cable protection spring is fixed to a structure etc, in which (a) is a plan view and (b) is a side view seen along a line A–A' in (a). In the figures, numeral 1 depicts a cable protection spring which is a coil spring formed by winding a steel wire with a fine interval. The diameter of the cable protection spring 1 is constant along its entire length. Numeral 2 depicts a structure, that is, to be more concrete, the arm of an industrial robot etc. Numeral 3 depicts a saddle which is an ironmongery goods formed by bending a rectangular steel plate into an Ω-shape. The saddles 3 are attached on the structure 2 so as to cross over the cable protection spring 1 in a manner that the cable protection spring 1 is fastened or gripped by the Ω-shaped sectional inner side of the saddle and fixed to the structure 2 by means of screws 4.

However, such a conventional cable protection spring requires a dedicated ironmongery goods such as a saddle for fixing the spring to a structure and further requires a tool such as a screwdriver or a wrench in order to fix the ironmongery goods. Thus, since the number of parts and the number of assembling processes increase, there arises a problem that a cost of the spring increases.

Further, there is another problem that skilled technique is required to fix the saddle. That is, if the saddle is fixed in a state that the spring is squeezed, that is, the spring is pushed down and deformed in an elliptic shape in its section, the spring will come out of the saddle easily when the robot moves and a tension acts on the spring. Thus, it is required to fix the saddle while paying attention so as not to deform the spring.

DISCLOSURE OF INVENTION

Accordingly, an object of the present invention is to provide a cable protection spring capable of being attached and fixed through one-touch operation without requiring an ironmongery goods or a tool for fixing. Further, an object of the present invention is to provide a method for attaching and fixing a cable protection spring through one-touch operation.

In order to attain the aforesaid object, the invention claimed in claim 2 is a cable protection spring which a wiring cable is passed within and through a coil spring to protect the wiring cable from mechanical damage. The cable protection spring is characterized in that the coil spring is provided with a portion having a diameter larger than a diameter of remaining portion thereof, and a winding interval of the large diameter portion of the coil spring is made larger than a winding interval of the remaining portion of the coil spring. Further, the invention claimed in claim 4 is a method for fixing a cable protection spring wherein the coil spring is provided with a portion having a diameter larger than a diameter of remaining portion thereof, the structure is provided with a groove having an inlet and an outlet with a small width and a center portion with a large width, the large diameter portion of the coil spring is compressed and pushed into the center portion of the groove thereby to fix the coil spring within the groove by a force acting at the center portion of the groove which is generated at the large diameter portion of the coil spring by trying to restore to its original length. The invention claimed in claim 3 is a method for fixing a cable protection spring wherein the coil spring is provided with a portion having a diameter smaller than a diameter of remaining portion thereof, and the structure is provided with a groove having an inlet and an outlet with a large width and a center portion with a small width, the small diameter portion of the coil spring is expanded and pushed into the center portion of the groove thereby to fix the coil spring within the groove by a force acting at the center portion of the groove which is generated at the small diameter portion of the coil spring by trying to restore to its original length.

BRIEF DESCRIPTION OF DRAWINGS

FIG. 5 parts (a) and (b) are external views of a cable protection spring showing an example of a conventional art, in which (a) is a plan view and (b) is a side view seen along a line A–A' in (a).

BEST MODE FOR CARRYING OUT THE INVENTION

Hereinafter, embodiments of the invention will be explained with reference to drawings.

Figure 1:
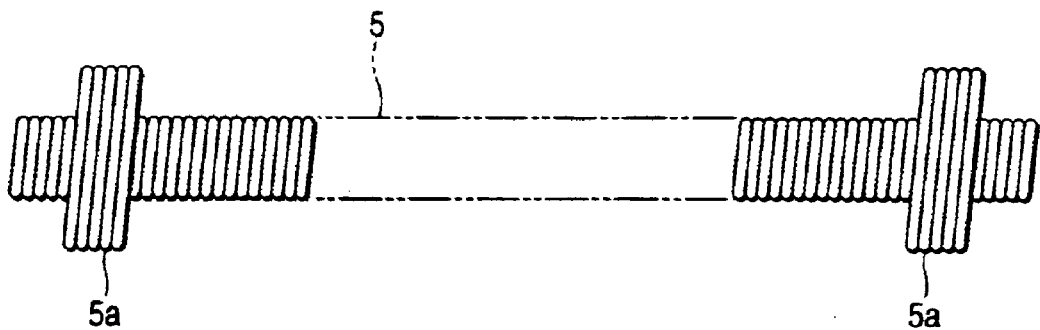
FIG. 1 is a plan view of a cable protection spring showing the first embodiment of the invention.

FIG. 1 is a plan view of a cable protection spring showing a first embodiment of the invention. In the figure, numeral 5 depicts a cable protection spring. The cable protection spring 5 is a coil spring which is formed by winding a steel wire with a fine interval so as to be in a tubular shape and is provided with brim portions 5a disposed along a longitudinal direction thereof so as to have a diameter larger than that of the remaining portion. Each of the brim potions 5a has the diameter larger than that of the remaining portion and further an interval of the winding coil is made larger, so that each of the brim portions 5a is compressed in its length when applied with a force in its longitudinal direction. Hereinafter, the portion of the cable protection coil other than the brim portions 5a is called a small diameter portion.

A cable to be protected which is passed within and through the cable protection spring 5 is not limited to an electric cable but may be an air pipe for a pneumatic device, a hydraulic pipe for a hydraulic device, a cooling water hose for cooling devices etc.

Figure 2:
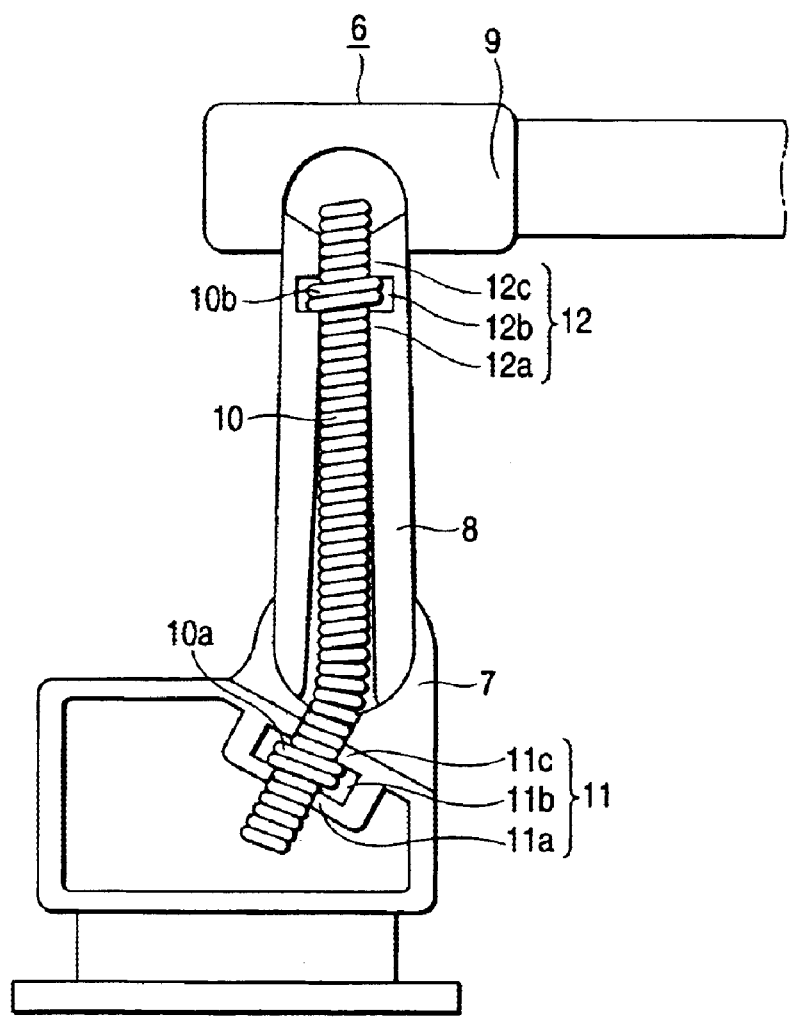
FIG. 2 is a side view of an industrial robot showing the second embodiment of the invention.

FIG. 2 is a diagram showing a second embodiment of the invention and is a side view showing a state where the cable protection spring according to the invention is attached to the arm of an industrial robot.

FIG. 2, numeral 6 depicts an industrial robot which is configured by a base 7, a lower arm 8 and an upper arm 9. The lower arm 8 and the upper arm 9 are attached to the base 7 and the lower arm 8 so as to be able to swing freely, respectively, and are driven by a not-shown driving device. In this respect, although each of the base 7 and the lower arm 8 is provided with a cover, the figure shows a state where the covers are removed in order to explain the internal structures thereof. Numeral 10 depicts a cable protection spring which protects a signal line, a power line and a pipe (not shown) etc. which are directed from the base 7 to the upper arm 9 through the lower arm 8. Two brim portions 10a, 10b are provided at the cable protection spring 10. Numeral 11 depicts a groove portion provided at the base 7. The width and the depth of each of the inlet portion 11a and the outlet portion 11c of the groove portion 11 are made smaller than the width and the depth of the remaining portion thereof, but is made slightly larger than the diameter of the small diameter portion of the cable protection spring 10. The width and the depth of the center portion 11b of the groove portion Ills made larger than the width and the depth of the remaining portion thereof, and is made slightly larger than the diameter of the brim portion 10a of the cable protection spring 10. Further, the length of the center portion is made shorter than that of the brim portion 10a. Numeral 12 depicts a long groove portion provided along almost the entire length of the lower arm 8. The width and the depth of each of the inlet portion 12a and the outlet portion 12c of the long groove portion 12 is made slightly larger than the diameter of the small diameter portion of the cable protection spring 10 but made smaller than the diameter of the brim portion 10b. That is, each of the inlet portion 12a and the outlet portion 12c has such a width and a depth of providing a slight allowance at the small diameter portion of the cable protection spring 10. The width and the depth of the center portion 12b of the long groove portion 12 is made larger than the width and the depth of the remaining portion thereof, and is made slightly larger than the diameter of the brim portion 10b of the cable protection string 10. Further, the length of the center portion of the long groove portion is made shorter than that of brim portion 10b.

Next, explanation will be made as to the procedure of attaching the cable protection spring 10 to the industrial robot 6. First, the brim portion 10a is compressed and shrunk in its length and inserted within the groove portion 11 in the compressed state. The brim portion 10a is urged against the groove portion 11 due to such a force of the brim portion caused by trying to restore to its original length within the groove portion 11 and so the coil is fixed therein. Then, the cable protection spring 10 is inserted into the inlet portion 12a of the long groove portion 12. Further, the brim portion 10b is compressed and inserted into the center portion 12b of the long groove portion 12.

In this manner, the cable protection spring 10 can be fixed through one-touch operation in a manner that the brim portions 10a, 10b are inserted into the groove portion 11 and the long groove portion 12, respectively.

When the aforesaid not-shown covers are attached to the base 7 and the lower arm 8, the groove portion 11 and the long groove portion 12 are also covered, so that the brim portions 10a and 10b serve as a member for preventing the groove portion 11 and the long groove portion 12 from coming out. Alternatively, the groove portion and the long groove portion may be tied with a band made of composite resin (for example, INSULOK (trade name)) in order to prevent them from coming out.

Figure 3:
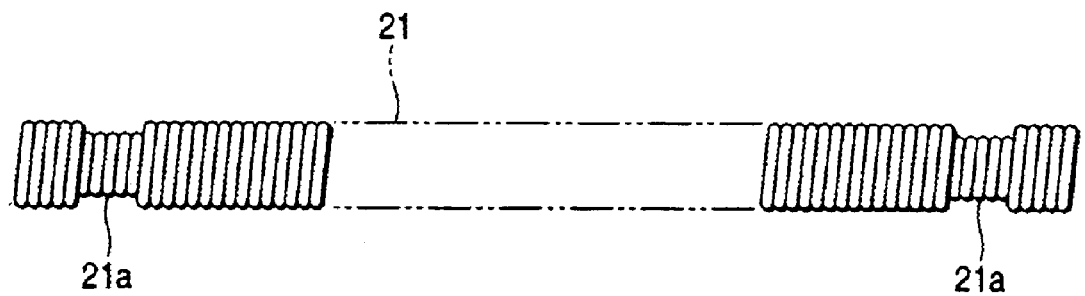
FIG. 3 is a plan view of a cable protection spring showing the third embodiment of the invention.
Figure 4:
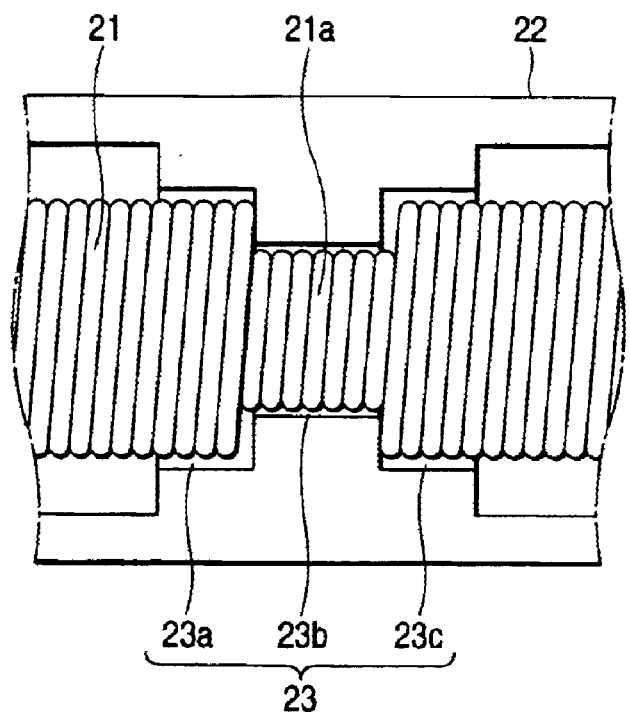
FIG. 4 is a side view showing a state where the cable protection spring of FIG. 3 is fixed to a structure.

FIG. 3 is a plan view of a cable protection spring showing a third embodiment of the invention. In the figure, numeral 21 depicts a cable protection spring. The cable protection spring 21 is a coil spring which is formed by winding a steel wire with a fine interval so as to be in a tubular shape and is provided with neck portions 21a disposed along a longitudinal direction thereof so as to have a diameter smaller than that of the remaining portion. Hereinafter, the portion of the cable protection coil other than the neck portions 21a is called a large diameter portion, FIG. 4 is a side view showing a state where the cable protection spring 21 is attached to a structure 22. The structure 22 is provided with a groove portion 23 for fixing the cable protection spring 21 thereto. The width and the depth of each of the inlet portion 23a and the outlet portion 23c of the groove portion 23 are made larger than the width and the depth of the remaining portion thereof, and is made slightly larger than the diameter of the large diameter portion of the cable protection spring 21. The width and the depth of the center portion 23b of the groove portion 23 is made smaller than the width and the depth of the remaining portion thereof. Further, the width of the center portion is made almost equal to the diameter of the neck portion 21a of the cable protection spring 21 and the length of the center portion is made shorter than that of neck portion 21a.

When attaching the cable protection spring 21 to the structure 22, the neck portion 21a is extended in its length and inserted within the groove portion 23 in the extended state. Thus, the neck portion 21a sandwiches the center portion 23b of the groove portion 23 by a force caused by trying to restore to its original length within the groove portion 23, whereby the cable protection spring 21 is fixed to the structure 22.

As described above, according to the invention, the cable protection spring is provided with the brim portion having a diameter larger than that of the remaining portion thereof, then the brim portion is pushed into the grove provided at the structure thereby to fix the cable protection spring within the groove by a reaction force of the spring. Thus, the invention can attain such a technical effect that the cable protection spring can be attached to the structure through one-touch operation without using a tool.

INDUSTRIAL APPLICABILITY

The present invention is usable for a cable protection spring for protecting a cable from mechanical damaged and a method for fixing the cable protection spring to a structure.

What is claimed is:

1. A cable protection spring which is arranged in a manner that a wiring cable is passed within and through a coil spring to protect the wiring cable from mechanical damage, wherein the coil spring is provided with a portion having a diameter larger than a diameter of a remaining portion thereof, and a winding interval of the large diameter portion of the coil spring is made larger than a winding interval of the remaining portion of the coil spring.

2. A method for fixing a cable protection spring, which is arranged in a manner that a wiring cable is passed within and through a coil spring to protect the wiring cable from mechanical damage, to a structure, wherein the coil spring is provided with a portion having a diameter larger than a diameter of a remaining portion thereof, the structure is provided with a groove having an inlet and an outlet with a small width and a center portion with a large width, the large diameter portion of the coil-spring is compressed and pushed into the center portion of the groove thereby to fix the coil spring within the groove by a force acting at the center portion of the groove which is generated at the large diameter portion of the coil spring by trying to restore to an original length thereof.

3. A method for fixing a cable protection spring, which is arranged in a manner that a wiring cable is passed within and through a coil spring to protect the wiring cable from mechanical damage, to a structure, wherein the coil spring is provided with a portion having a diameter smaller than a diameter of a remaining portion thereof, the structure is provided with a groove having an inlet and an outlet with a large width and a center portion with a small width, the small diameter portion of the coil spring is expanded and pushed into the center portion of the groove thereby to fix the coil spring within the groove by a force acting at the center portion of the groove which is generated at the small diameter portion of the coil spring by trying to restore to an original length thereof.

* * * * *